United States Patent [19]

Hicks

[11] Patent Number: 4,706,496
[45] Date of Patent: Nov. 17, 1987

[54] DIAPHRAGM GAS METER

[75] Inventor: Irwin A. Hicks, Radnor, Pa.

[73] Assignee: American Meter Company, Philadelphia, Pa.

[21] Appl. No.: 863,226

[22] Filed: May 14, 1986

[51] Int. Cl.$^4$ .............................................. G01F 11/08
[52] U.S. Cl. ..................................................... 73/268
[58] Field of Search .......................................... 73/268

[56] References Cited

U.S. PATENT DOCUMENTS 1,642,899  9/1927  Simpson .................................. 73/268
1,898,253  2/1933  MacLean et al. ...................... 73/268

Primary Examiner—Herbert Goldstein
Attorney, Agent, or Firm—David L. Davis

[57] ABSTRACT

A diaphragm gas meter wherein the movement of the diaphragms is in a side to side direction and the transfer valve assembly and connecting linkages are all substantially toward the rear of the meter.

5 Claims, 4 Drawing Figures

DIAPHRAGM GAS METER

DESCRIPTION

Background of the Invention

This invention relates to gas meters and, more particularly, to an improved design for a diaphragm gas meter.

Diaphragm meters have been in use for over one hundred fifty years to measure gas flow. In general, such meters have proven to be reliable and accurate. However, it would be desirable to reduce the overall size of a diaphragm meter for a given capacity rating in order to reduce its cost. It is also always desirable to simplify a design to reduce cost. If such cost improvements can also result in an improvement in initial accuracy and accuracy retention, then it becomes desirable for quality of product as well. It is therefore an object of the present invention to make such a size reduction and simplification in a diaphragm meter while improving its initial accuracy and accuracy retention.

SUMMARY OF THE INVENTION

The foregoing, and additional, objects are attained in accordance with the principles of this invention by providing a four chamber diaphragm meter comprising a generally box-like casing having the top side open and including a planar, perpendicular partition extending from the open side to divide the casing into two substantially equal casing compartments, a plate-like valve table adapted for attachment to the casing to seal the two casing compartments, a generally box-like top piece having the bottom side open and adapted for attachment to the casing over the valve table to provide a gas inlet chamber, the top piece including a gas inlet connection and a gas outlet connection, the gas inlet connection being disposed over a first of the casing compartments and the gas outlet connection being disposed over the other of the casing compartments, a pair of measuring chambers mounted on a first side of the valve table, each of the measuring chambers extending from the valve table into a respective one of the casing compartments, each of the measuring chambers including a diaphragm sleeve element fixedly mounted at one end and sealed at the other end, each of the diaphragm sleeve elements being so arranged that its sealed end moves toward and away from its fixed end along a line substantially perpendicular to the partition separating the casing measurement chambers in response to gas flow through the meter, a transfer valve assembly mounted on the other side of the valve table and within the gas inlet chamber including a first transfer valve associated with a first of the measuring chambers and a first of the casing compartments and a second transfer valve associated with the other of the measuring chambers and the other of the casing compartments, the first and second transfer valves having valve elements arranged for sliding motion along lines substantially perpendicular to each other and each substantially forty-five degrees to the partition, means for linking the movable sealed ends of the diaphragm sleeve elements and the sliding valve elements, the linking means including a pair of diaphragm flag rods each coupled to the movable sealed end of a respective diaphragm sleeve element and extending through the valve table at a point in line with a respective transfer valve on the side of the respective transfer valve opposite the intersection of the lines of motion of the sliding valve elements, and index means coupled to the linking means for indicating the volume of gas flowing through the meter.

Meter connector spacing is standardized in the industry. Accordingly, diaphragm meters must have a minimum width to satisfy the connector spacing. Prior designs for diaphragm meters have generally been arranged so that the diaphragms move in a front-to-back direction, using the full width of the meter to determine the diaphragm diameter. This diaphragm diameter then substantially determines the height and depth of the meter, since these dimensions must accommodate the diameter of the diaphragm. With one pair of measuring chambers being in the front of the meter, this requires that one set of valves and linkages also be in the front of the meter, thereby placing limitations on the location of the index and/or electronic circuitry associated with the meter. As will be described in full detail hereinafter, the improved diaphragm meter design according to the principles of this invention uses the standardized spacing between meter connectors to define the stroke, not the diameter, of the diaphragms. Thus, the diaphragms move side-to-side, rather than front-to-back. Since each pair of measuring chambers is on either one or the other side of the meter, the linkages and valves can be disposed generally in the rear half of the meter, so that there is room in the front of the meter for the index and/or electronic circuitry without increasing the size of the meter.

The increase in diaphragm stroke for a given capacity has a number of advantages. The larger stroke causes the diameter of the "tangent" (the point of transfer of reciprocating motion to circular motion), which diameter is the means of volume (or accuracy) adjustment, to increase significantly. As will be herein described, this significantly increased tangent diameter permits proportionately finer (more accurate) adjustment to the initial meter calibration, and proportionately reduces the effect of wear, resulting in improved accuracy retention.

In addition, it has been the practice in the industry to use a single crankshaft for connecting the diaphragms to the valves, the single crankshaft significantly adding to the height of the meter. As will be described in full detail hereinafter, in accordance with the principles of this invention, the traditional crank functions are split into two parts which are geared together. This approach permits the valves to be advantageously positioned towards the back of the meter while shortening the meter height as the crankshaft functions of diaphragm drive and valve drive are split and more closely vertically compacted.

It has also been the practice in the industry to have the cranks which drive the valves pass over the tops of the valves to reduce valve "crabbing" and to simplify valve timing geometry (calculations). As will be described in full detail hereinafter, the improved diaphragm meter design according to the principles of this invention has valve cranks driving off the crank sides of the valves, the advantage being reduction in meter height. When geometry is properly calculated, extensive tests have shown problems anticipated in valve crabbing to be of minimial concern.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1:
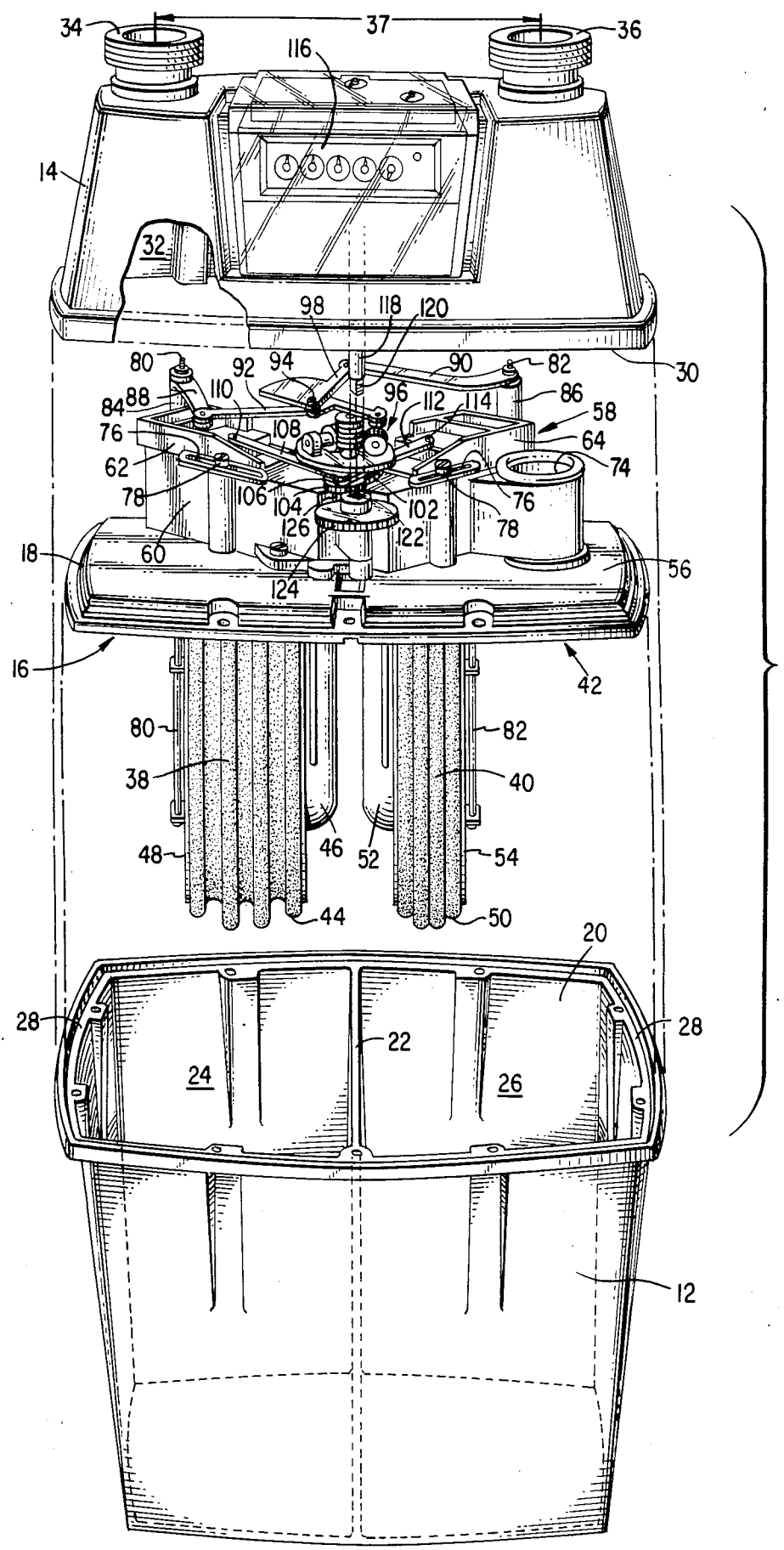
FIG. 1 is a partially exploded front perspective view of an illustrative embodiment of a meter constructed in accordance with the principles of this invention.

Referring now to the drawings, primarily FIG. 1, the meter designated generally by the reference numeral 10 consists of a casing 12, a top piece 14, and a metering cartridge 16 mounted on a valve table 18. The casing 12 is generally box-like in configuration and has an open side 20 and a planar partition 22 extending from the open side 20 to divide the casing 12 into two substantially equal casing compartments 24 and 26. The casing 12 is further formed with a ledge 28 extending around the periphery of the open side 20, the ledge 28 supporting the valve table 18 when the meter 10 is fully assembled.

The top piece 14 is of generally box-like configuration and has an open side 30, the top piece 14 adapted for attachment to the casing 12 over the valve table 18 to provide a gas inlet chamber 32. The top piece 14 includes a gas inlet connection 34 and a gas outlet connection 36, with the gas inlet connection 34 being disposed over the first casing compartment 24 and the gas outlet connection 36 being disposed over the second casing compartment 26. The spacing 37 between the connections 34 and 36 is according to industry standards. In the United States, for example, 6", 8¼", and 11" are current spacing standards and this dimension determines the size of the meter 10.

Figure 4:
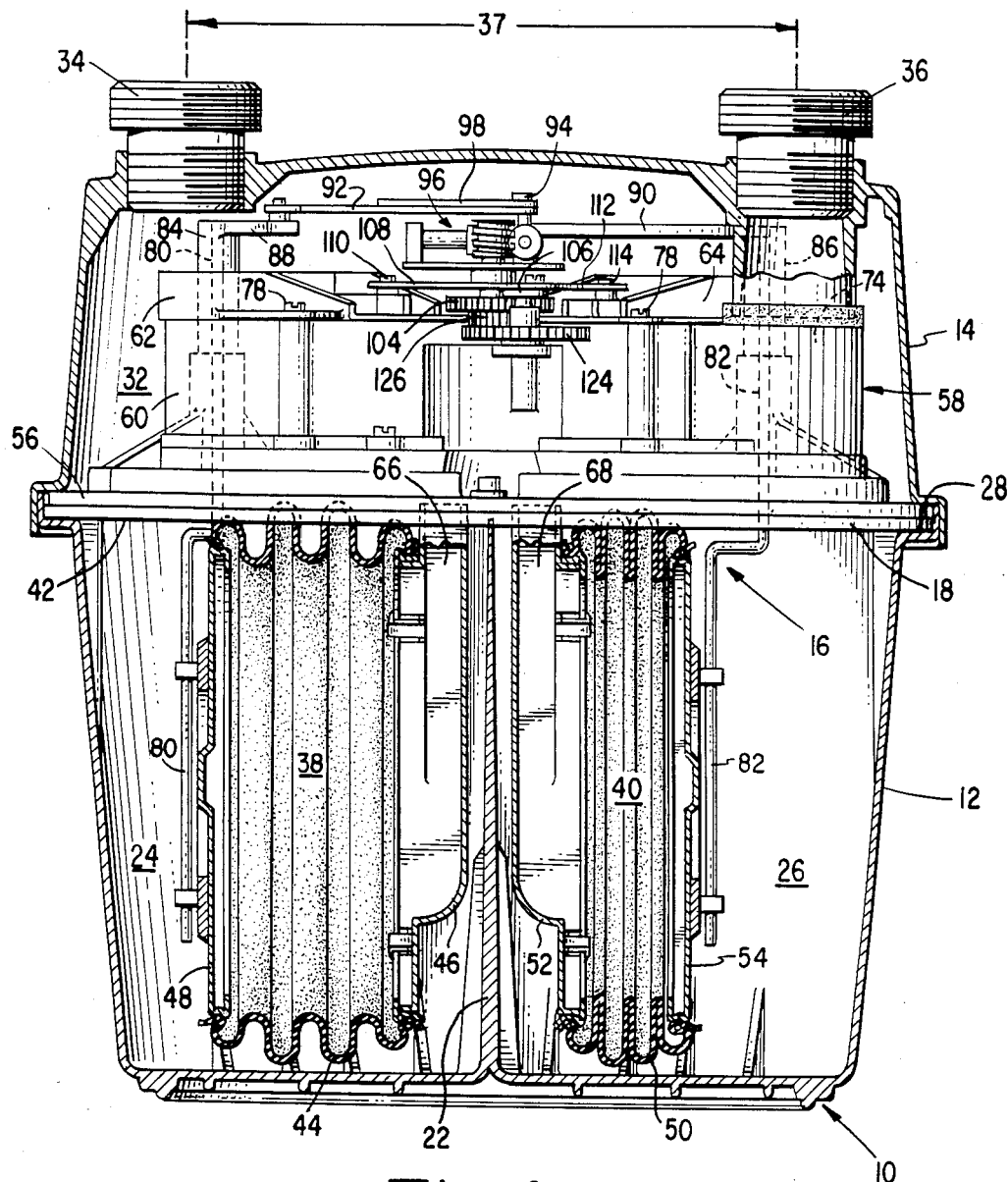
FIG. 4 is a front sectional view of the meter of FIG. 1 taken substantially laterally.

The metering cartridge 16 is mounted on the platelike valve table 18 which rests on the ledge 28 and is therefore captured between the casing 12 and the top piece 14, as illustrated in FIG. 4. The metering cartridge 16 includes a pair of measuring chambers 38 and 40 mounted on a first side 42 of the valve table 18 and extending from the valve table 18 each into a respective one of the casing compartments 24 and 26. The first measuring chamber 38 includes a convoluted diaphragm sleeve element 44 which is fixedly mounted at a first end to a diaphragm conduit 46 and is sealed at the other end by a pan 48. The sleeve element 44 is so arranged that its sealed end can move toward and away from its fixed end along a line substantially perpendicular to the partition 22 in response to gas flow through the meter 10, as will become apparent from the following description. Likewise, the second measuring chamber 40 includes a convoluted diaphragm sleeve element 50 fixedly mounted at one end to a diaphragm conduit 52 and sealed at the other end by a pan 54, with the sealed end movable toward and away from the fixed end along a line substantially perpendicular to the partition 22.

Figure 2:
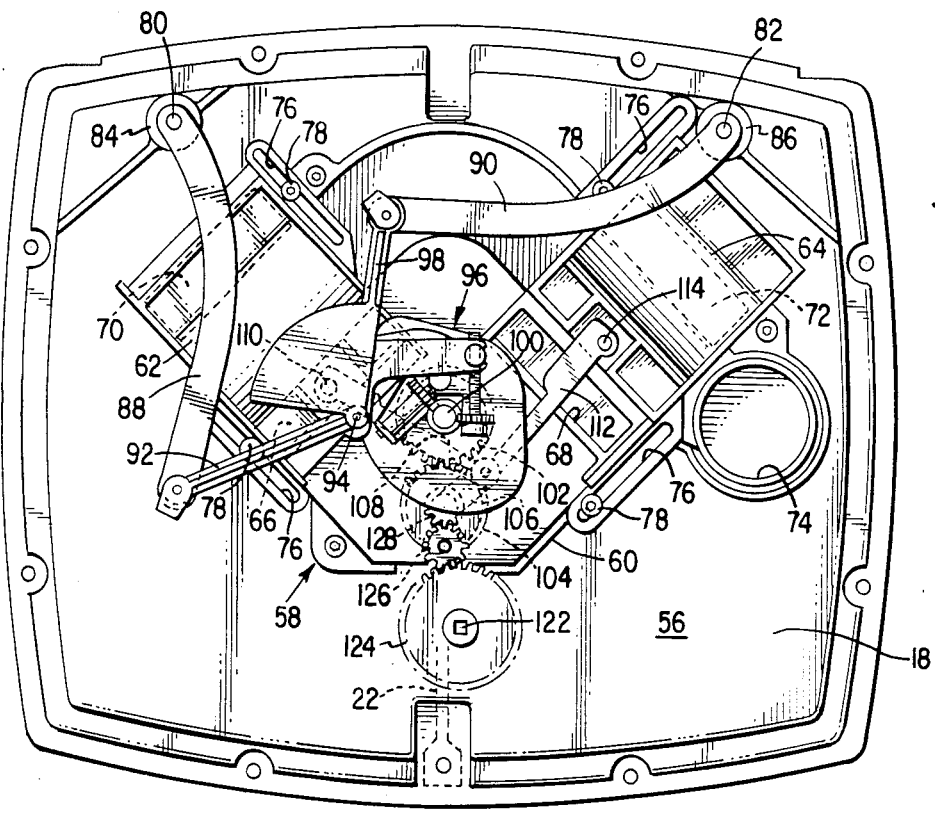
FIG. 2 is a top plan view of the meter of FIG. 1 with the top piece removed.
Figure 3:
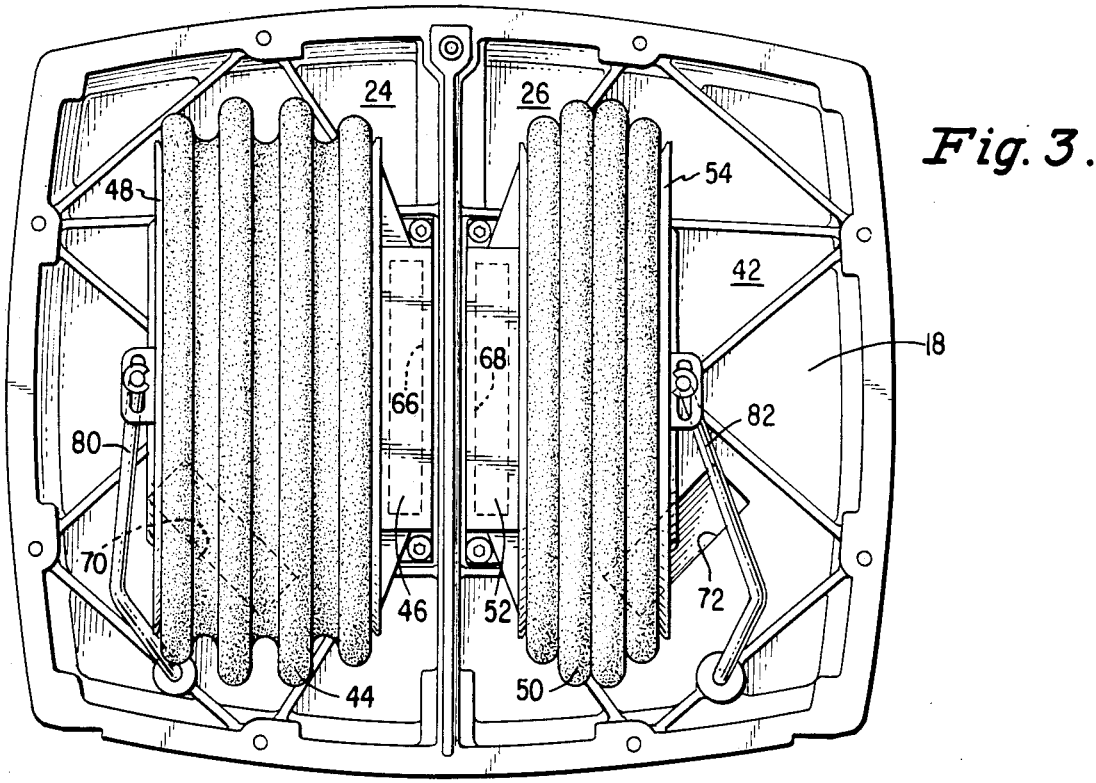
FIG. 3 is a bottom plan view of the meter of FIG. 1 with the casing removed.

The second side 56 of the valve table 18 has mounted thereon a transfer valve assembly 58. The transfer valve assembly 58 includes a first transfer valve 62 associated with the first measuring chamber 38 and the first casing compartment 24 and a second transfer valve 64 associated with the second measuring chamber 40 and the second casing compartment 26. Thus, the transfer valve assembly 58 includes a unitary molded valve seat element 60 and first and second sliding valve elements 62 and 64, respectively. As is conventional in the art of diaphragm meters, and referring to FIGS. 2 and 3, the valve seat element 60 includes a first diaphragm port 66 communicating through the valve table 18 with the diaphragm conduit 46; a second diaphragm port 68 communicating through the valve table 18 with the diaphragm conduit 52; a first compartment port 70 communicating through the valve table 18 with the first casing compartment 24; a second compartment port 72 communicating through the valve table 18 with the second casing compartment 26; and an exhaust port 74 communicating with the gas outlet connection 36. As is conventional, each of the sliding valve elements 62 and 64 either couples a respective diaphragm port to the exhaust port 74 and opens the compartment port to the gas inlet chamber 32 or couples a respective compartment port to the exhaust port 74 and opens the respective diaphragm port to the gas inlet chamber 32. The exhaust port is always connected to a diaphragm port and/or a compartment port, and is never connected to the inlet chamber 32. As may be seen best from FIG. 2, the sliding valve elements 62 and 64 are arranged for sliding motion along lines substantially perpendicular to each other and each substantially forty-five degrees to the partition 22. This is accomplished by providing for each of the sliding valve elements 62, 64, a pair of guide slots 76 which cooperate with guide pins 78 secured to the valve seat element 60.

As is well known, in order to synchronize the movement of the valves and the diaphragms, there is provided means for linking the movable sealed ends of the diaphragm sleeve elements 44, 50 and the sliding valve elements 62, 64. This linking means comprises the flag rods 80 and 82 connected to the diaphragm pans 48 and 54, respectively. The flag rods 80,82 extend through the valve table 18 and are journaled for pivoting motion in the towers 84 and 86, respectively. As is clearly shown in FIG. 2, the towers 84 and 86 are behind their respective transfer valves and on lines which pass through the tangent assembly shaft 100, these two lines intersecting perpendicular to each other and substantially 45° from the partition 22. A long flag arm 88 is non-rotatably coupled to the flag rod 80 and a long flag arm 90 is non-rotatably coupled to the flag rod 82. A short flag arm 92 is coupled between the free end of the long flag arm 88 and the wrist pin 94 of the adjustable tangent assembly 96. Similarly, the short flag arm 98 is coupled between the free end of the long flag arm 90 and the wrist pin 94.

Unique to this design, the tangent assembly 96 rotates on the shaft 100 on which is mounted a first gear 102. A second gear 104 engages the first gear 102 and is rotated thereby. A crank 106 is mounted on the second gear 104. A valve arm 108 is connected to the crank 106 and a pin 110 on the first sliding valve element 62. Similarly, a valve arm 112 is connected to the crank 106 and a pin 114 on the second sliding valve element 64. It is noted that the pins 110 and 114 on the sliding valve elements 62 and 64 are on the tangent side of the sliding valve elements so that the valve arms 108 and 112 can have a relatively low elevation since they do not have to pass over the sliding valve elements, as in conventional meter designs. Splitting the conventional arrangement of valve crank and tangent assembly on the same centerline, by providing a geared connection between these functions, permits a significant reduction in the overall height of the meter 10. Similarly, positioning the valve arms 108 and 112 on the tangent side of the sliding valve elements permits a further reduction in the overall height of the meter 10.

Referring back to FIG. 1, in order to indicate the volume of gas flowing through the meter 10, there is provided an index 116 mounted on the top piece 14. The input to the index 116 is the index input shaft 118 which extends into the gas inlet chamber 32. The end of the shaft 118 is squared off at the end 120 so that it fits into the square opening 122 of the gear 124, which is coupled through the gears 126 (see FIG. 2) and 128 to the crank gear 104.

To appreciate the advantages of the invention design described above, it is desirable to understand the current design practice for meters. Since the centerline distance between the inlet and outlet connectors is dictated by industry standards, the width of a given meter enclosure is generally fixed at a dimension consisting of the connector spacing plus the connector outside diameter, plus some draft clearances on the meter enclosure. Since the enclosure width is fixed, it has been industry practice to make the diaphragm as large in diameter as possible to fit within this enclosure width, the theory being that larger diameter diaphragms are advantageous in reducing meter rotational velocity, and thus reducing wear, resulting in improved accuracy retention. For example, if the meter connector spacing is 11" (one industry standard), and the meter connector diameter is 2" (an industry standard), then the meter width will be approximately 14", taking into consideration ½" draft clearance for each side of the meter. In current design approaches, this results in a meter depth of approximately the same dimension as the width (or slightly larger) due to geometric considerations (the flag arm positioning dictated by design). In conventional meter construction, the front-to-back diaphragms dictate that the flag arms be on centerlines, 90° in arc from each other, which must both intersect the tangent centerline due to timing considerations. The flag arm positions in relation to the front-to-back diaphragms thus require a depth of meter approximately equal to the meter width. Further, since the valve crank centerline is generally coaxial with the tangent crank centerline, the valves are generally set on centerlines spaced by 90° of arc, directly opposite the flag arm centerlines, and also passing through the tangent/valve crank centerlines. Thus, the meter connector spacing (and connector diameter to a lesser degree) pretty much determine conventional meter width and depth (and, to a large degree, height). There are "bell crank" meter designs which can substantially reduce meter depth. In this type of design, the diaphragms (which are still the width of the connector spacing plus connector diameter plus draft) are positioned much closer to each other to reduce or eliminate any wasted space between each diaphragm which in return requires the valves to operate on parallel centerlines. Such mechanisms are more complicated (additional arms and bearings) but do reduce meter depth (but increase height). The side-to-side design disclosed herein has the advantages of reducing meter depth and height due to utilization of a smaller diameter diaphragm. Since meter wear is proportional to velocity of operation, it is desirable to increase the stroke of the diaphragm to compensate for the smaller diaphragm diameter (to maintain equal meter velocity). This longer stroke in turn increases the tangent diameter, which permits more accurate initial adjustment and reduces the effect of wear. Thus, both initial accuracy and accuracy retention are improved. In short, trading stroke for bore, to maintain rotational velocity, not only reduces meter height and depth, but has the very beneficial effect of proportionately improving initial calibration and reducing the effects of various bearing wear.

While there have been numerous arrangements designed in the past to drive the valve arms (e.g., "bell cranks" as discussed above), the use of a timing gear set in a gas meter, as described above, is believed to be unique. The advantage of the timing gear concept is that the valves do not have to be arranged to have their centerlines pass through the crank centerline as is required when a single piece tangent and valve arm crank is used. This permits the valve crank gear, which must have the same number of teeth as the tangent gear, to be used as part of the index gear drive, and allows great freedom of valve placement. Note that if a single valve gear is used, the valves must be arranged on centerlines at 90° to each other. If two valve gears are used, the valves must still act as though they are 90° from each other in timing.

Accordingly, there has been disclosed an improved design for a diaphragm gas meter. It is understood that the above-described embodiment is merely illustrative of the application of the principles of this invention. Numerous other embodiments may be devised by those skilled in the art without departing from the spirit and scope of this invention, as defined by the appended claims.

I claim:

1. A four chamber diaphragm gas meter comprising:
  a generally box-like casing having one open side and a planar partition extending from the open side to divide the casing into two substantially equal casing compartments;
  a plate-like valve table adapted for attachment to said casing to seal said two casing compartments;
  a generally box-like top piece having one open side adapted for attachment to said casing over said valve table to provide a gas inlet chamber, said top piece including a gas inlet connection and a gas outlet connection, the gas inlet connection being disposed over a first of said casing compartments and the gas outlet connection being disposed over the other of said casing compartments;
  a pair of measuring chambers mounted on a first side of said valve table, each of said measuring chambers extending from said valve table into a respective one of said casing compartments, each of said measuring chambers including a diaphragm sleeve element fixedly mounted at one end and sealed at the other end, each of said diaphragm sleeve elements being so arranged that its sealed end moves toward and away from its fixed end along a line substantially perpendicular to said partition in response to gas flow through said meter;
  a transfer valve assembly mounted on the other side of said valve table and within said gas inlet chamber including a first transfer valve associated with a first of said measuring chambers and a first of said casing compartments and a second transfer valve associated with the other of said measuring chambers and the other of said casing compartments, said first and second transfer valves having valve elements arranged for sliding motion along lines substantially perpendicular to each other and each substantially forty-five degrees to said partition;

means for linking the movable sealed ends of said diaphragm sleeve elements and said sliding valve elements, said linking means including a pair of diaphragm flag rods each coupled to the movable sealed end of a respective diaphragm sleeve element and extending through said valve table at a point in line with a respective transfer valve on the side of said respective transfer valve opposite the intersection of the lines of motion of the sliding valve elements; and index means coupled to said linking means for indicating the volume of gas flowing through said meter.

2. The meter according to claim 1 wherein said linking means further includes a rotatable tangent assembly having a wrist pin, a pair of long flag arms each nonrotatably connected to a respective flag rod, a pair of short flag arms each rotatably coupled to said wrist pin and a respective long flag arm, a first gear rotating with said tangent assembly, a second gear engaged with said first gear, a crank connected to said second gear, and a pair of valve arms each connected to said crank and a respective sliding valve element.

3. The meter according to claim 2 wherein the connection between each of said valve arms and its respective sliding valve element is at a point on said valve element on the side closest to said intersection.

4. The meter according to claim 2 wherein said first and second gears have the same number of teeth.

5. The meter according to claim 2 wherein said index means is coupled to said second gear.

* * * * *